L. BACH AND E. KUEBLER.
FLOWER STAND.
APPLICATION FILED FEB. 5, 1919, RENEWED DEC. 11, 1919.

1,334,069.

Patented Mar. 16, 1920.
2 SHEETS—SHEET 1.

INVENTORS
Leopold Bach
Elias Kuebler
BY Frederick Myers
ATTORNEY

L. BACH AND E. KUEBLER.
FLOWER STAND.
APPLICATION FILED FEB. 5, 1919, RENEWED DEC. 11, 1919.
1,334,069.
Patented Mar. 16, 1920.
2 SHEETS—SHEET 2.
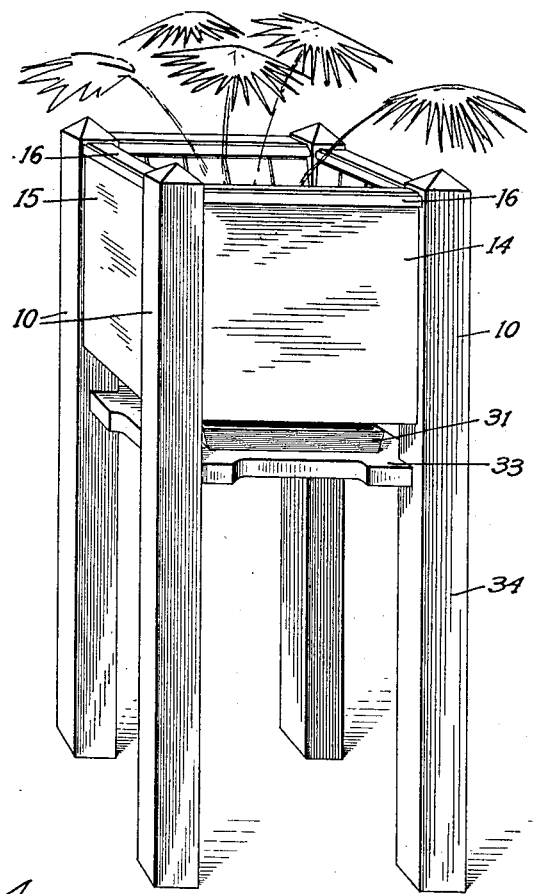
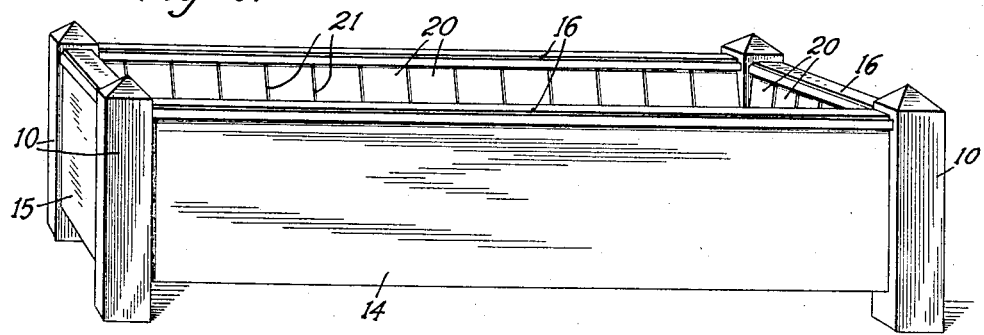
INVENTORS
Leopold Bach
Elias Kuebler
BY
Frederick Myers
ATTORNEY

UNITED STATES PATENT OFFICE.

LEOPOLD BACH AND ELIAS KUEBLER, OF NEW YORK, N. Y.

FLOWER-STAND.

1,334,069.     Specification of Letters Patent.     Patented Mar. 16, 1920.

Application filed February 5, 1919, Serial No. 275,120. Renewed December 11, 1919. Serial No. 344,268.

*To all whom it may concern:*

Be it known that I, LEOPOLD BACH, a citizen of the United States, residing at 541 E. 148th St., N. Y. C., county of New York, and State of New York, and I, ELIAS KUEBLER, a citizen of Germany, residing at 421 E. 64th St., N. Y. C., county of New York, and State of New York, have invented certain new and useful Improvements in Flower-Stands, of which the following is a specification.

This invention relates to improvements in holders for growing plants and is particularly adapted for indoor use.

The principal object of the invention is to provide a neat appearing portable holder, in which growing plants may be cultivated indoors without the use of the ordinary earthern vessels commonly employed.

A further object is to provide a holder for the earth in which the roots of the plant are embedded, the holder being so constructed as to admit air to the soil in such a manner as to cause an unusual development of the plant growing therein.

These and other like objects are attained by the novel construction and combination of parts hereinafter described, and shown in the accompanying drawings, forming a material part of this disclosure, and in which—

Fig. 3 is a perspective view showing a further modified form of the holder.

Fig. 4 is another perspective view showing a further modified form of the holder.

Figure 1:
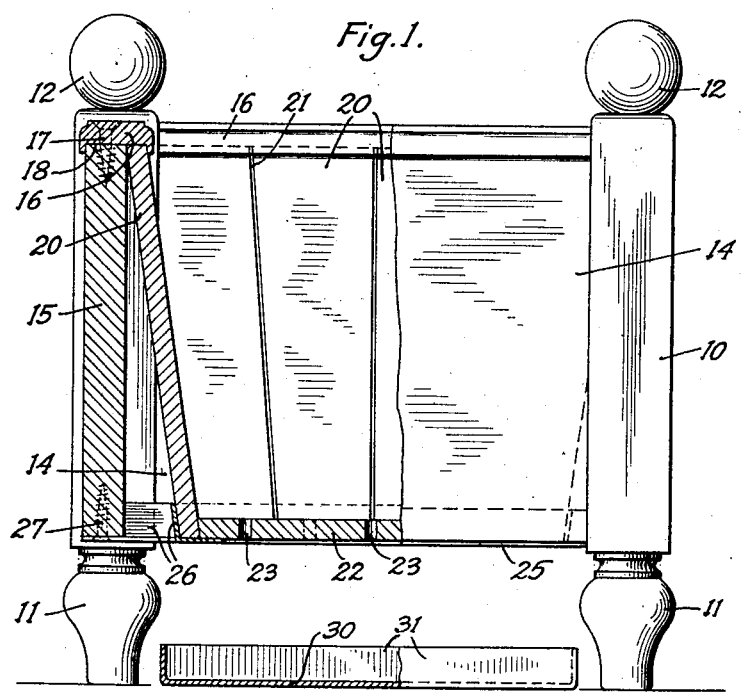
Figure 1 is a side elevational view, partially in section, showing a preferred embodiment of the holder.
Figure 2:
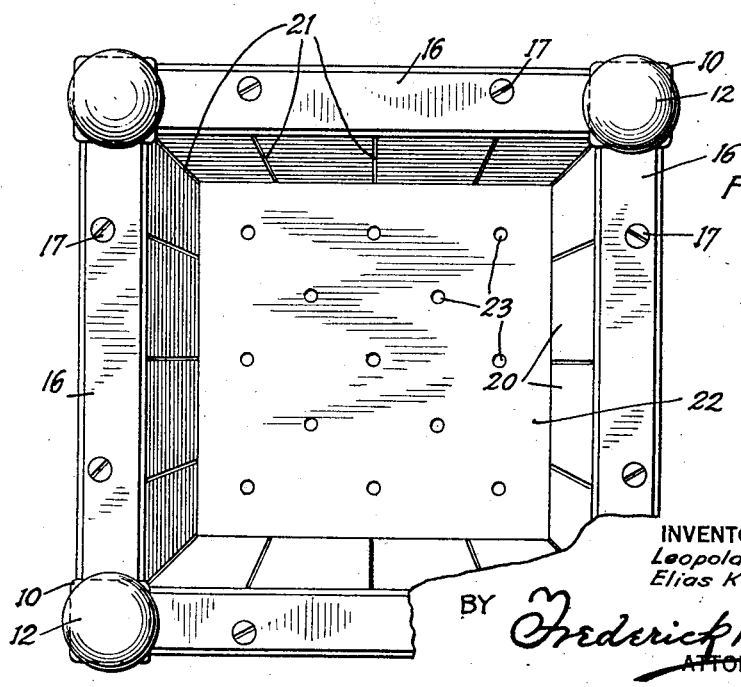
Fig. 2 is a top plan view thereof.

The holder comprises a rectangular structure, preferably made of wood, having corner posts 10, formed with feet 11, and provided with ornamental knobs 12 at their tops. Engaged between the corner posts are side and end elements, respectively 14 and 15, over which are secured strips 16, held by screws 17, and having longitudinal recesses 18, in their lower surfaces.

These recesses are receptive of the upper edges of the side and end elements 14 and 15, while in the inner portion of the recesses 18 are positioned the upper ends of diagonally disposed plates 20, these plates being free to move sidewise with relation one to another, permitting expansion and contraction, and presenting open spaces 21, permitting the entrance of air to the soil contained therein, whereby the growth of the plant is greatly enhanced.

The lower edges of the plates 20 are engaged with a bottom plate 22, containing a plurality of perforations 23, acting as drainage openings, and also admitting air to the soil. The bottom plate 22, and the lower ends of the diagonal inner plates being supported by metallic bars 25, formed angularly and presenting substantially vertical flanges 26, which are arranged to cross each other, at their corners, and are secured by the screws 27 to the lower edges of the outer side elements 14 and 15.

Upon withdrawing the screws 27 the angle supports 25 and 26 may be removed, permitting the release of the inner plates 20, and it will be obvious that air may enter the interior of the holder through the openings 21 and 23, materially assisting in the growth of the plant.

In order to prevent water and loose particles of the soil, from dropping upon the surface on which the feet 11 rest, use is made of a pan 30, having raised side walls 31, the same being so shaped as to pass below the holder between the feet 11, and rest upon the same supporting surface.

In the modification shown in Fig. 3, a plate 33 is secured between the elongated legs or upright supports 34, the same being a continuation of the corner elements 10, thus enabling the holder to be moved from place to place and maintained at a desirable height from the supporting surface.

In the modification shown in Fig. 4 the feet 11 are omitted and the side plates 14 elongated, forming a window box adapted to rest upon an ordinary window sill in an obvious manner, the interior construction in both modifications being substantially like that previously described.

Having thus described our invention, what we claim as new and desire to secure by Letters Patent, is—

A growing plant holder, comprising four vertical columns, side plates rigidly engaged therebetween, recessed strips engaged at the upper ends of said columns, to which said side plates are secured, angularly formed metallic bars engaged at the bottom of said side plates, and arranged to cross each other, a plurality of diagonally disposed inner plates, having their upper ends in the recesses of said strips and resting within the angles of said cross bars at their bottoms, said strips being loosely contained and having spaces between their adjacent edges, a bottom plate resting on said cross bars, said bottom plate having perforations, and secured to the lower edges of said diagonally disposed plate and a pan adapted to be disposed below said bottom plate for receiving the drippings therefrom, said structure forming a receiver adapted to contain earth and a growing plant embedded therein, in such manner that air between said spaces and perforations may make contact with the earth.

In testimony whereof we have affixed our signatures.

LEOPOLD BACH.
ELIAS KUEBLER.